United States Patent [19]

Miller et al.

[11] Patent Number: 4,513,796
[45] Date of Patent: Apr. 30, 1985

[54] HIGH SPEED BULK COMPOUNDER

[75] Inventors: Carl Miller, Lake in the Hills; Lawrence R. Hogan, Lake Villa, both of Ill.

[73] Assignee: Baxter Travenol Laboratories, Inc., Deerfield, Ill.

[21] Appl. No.: 391,759

[22] Filed: Jun. 24, 1982

[51] Int. Cl.³ .............................................. B65B 3/30
[52] U.S. Cl. ...................................... 141/83; 141/94; 141/100; 73/32 R; 222/14; 222/56; 222/77; 604/81; 604/153; 604/245
[58] Field of Search ................. 141/1, 9, 83, 100–107, 141/234–248; 177/1, 70, 80, 121, 137, 164, 210 R, 211, 50; 364/509, 510; 604/65, 67, 80, 81, 151–153, 245, DIG. 13; 222/77; 73/32 R

[56] References Cited

U.S. PATENT DOCUMENTS

| | | | |
|---|---|---|---|
| 2,199,010 | 4/1940 | Robb | 222/77 |
| 3,306,495 | 2/1967 | Wabers | 222/77 |
| 3,749,285 | 7/1973 | Latham, Jr. | 222/58 |
| 4,222,496 | 9/1980 | Start et al. | 222/77 |
| 4,272,824 | 6/1981 | Lewinger et al. | 141/83 |
| 4,301,880 | 11/1981 | Krambrock et al. | 141/83 |
| 4,320,855 | 3/1982 | Ricciardi et al. | 222/77 |
| 4,350,186 | 9/1982 | Schalkowsky et al. | 141/83 |

Primary Examiner—Houston S. Bell, Jr.
Attorney, Agent, or Firm—Paul C. Flattery; Robert A. Benziger

[57] ABSTRACT

The present invention provides a fast, efficient, precise method and apparatus for compounding solutions for use in hyperalimentation therapy. The apparatus includes a controller for entering the volume and specific gravity of the solution to be compounded.

A load cell monitors the weight of the solutions that have been transferred to a collection vessel and in connection with the controller thereby maintains the precise amount of each therein. The controller also surveys various process conditions and warns of any failure of those conditions. Peristaltic pumps are used for the delivery of the compounding solution to maintain the solutions in a sterile condition.

1 Claim, 3 Drawing Figures

HIGH SPEED BULK COMPOUNDER

BACKGROUND OF THE INVENTION

The present invention pertains to a process and apparatus for precisely transferring solutions at high speed. More particularly, it pertains to such a process and apparatus especially useful for the compounding of hyperalimentation solutions.

Hyperalimentation therapy is the intravenous feeding of, for example, a protein-carbohydrate mixture to a patient. It is used primarily to meet the patient's protein and caloric requirements which are unable to be satisfied by oral feeding. The protein may be in the form of free-amino acids or protein hydrolysate and the carbohydrate commonly is dextrose. In addition to the protein and carbohydrate, vitamins (water-soluble and fat-soluble) and electrolytes also can be supplied in this therapy.

Each of these parenteral ingredients and the combination thereof are particularly susceptible to the growth of deleterious organisms and it is desirable that they be administered to the patient in a sterile condition. Thus, because these protein and carbohydrate solutions cannot be pre-compounded by the manufacturer, but must be combined at the time of their use, their compounding must be performed under sterile conditions to avoid organism growth.

A known apparatus and process for compounding hyperalimentation solutions utilizes a solution transfer system including a receiving container and a Y-transfer set. The Y-transfer set includes two separate tubes, each having an end attached to a common juncture by which solutions delivered through the tubes will pass through the juncture into the receiving container. The other end of one tube of the set is attached to the protein holding container and of the other tube of the set to the carbohydrate holding container. The desired volume of each solution being transferred to the container is controlled by a clamp placed on each tube. The solutions may be allowed to flow into the receiving container by gravity flow. However, it has been found to be useful to transfer the solutions under the influence of a vacuum applied to the receiving container. When the receiving container is a flexible plastic container, the vacuum is created in a vacuum chamber into which the container is placed.

It has been known in the past that to ensure sterility during the compounding of hyperalimentation solutions, compounding should be performed under a laminar flow hood. Laminar flow hoods are used for reducing the risk of airborne contamination of such solutions. These units operate by taking room air and passing it through a pre-filter to remove gross contaminates, such as dust and lint. The air is then compressed and channeled through a bacterial retentive filter in the hood in a laminar flow fashion. The purified air flows out over the entire work surface of the hood in parallel lines at a uniform velocity. The bacterial retentive type of filter is designed to remove all bacteria from the air being filtered.

Compounding under a laminar flow hood aids in preventing airborne contamination, but it is relatively cumbersome and expensive and would not be useful for eliminating any other source of contamination, such as contamination caused by handling. When using a hood the operator may inadvertently perform the work at the end or outside of the hood and not within the recommended space, at least six (6) inches within the hood, which insures the benefits of the air being purified. Time must be taken and care must be exercised to maintain a direct open path between the filter and the compounding area. Solution bottles and other nonsterile objects cannot be placed at the back of the hood work area next to the filter because these objects could contaminate everything downstream and disrupt the laminar flow pattern of the purified air. Also, in using a laminar flow hood, it is necessary routinely to clean the work surface of the hood before any compounding is performed.

Thus, the prior art apparatus and process discussed above are disadvantageous due to the extensive number of hand operations which are time consuming and can be error prone.

An apparatus and process utilizing a filter system in the compounding operation poses new problems. The viscosities of some of these parenteral solutions could cause filter clogging and, consequently, retard transfer through the filter and apparatus. Also, the viscosities of the solutions may be and are generally different, which could lead to an unequal or otherwise undesired mixture of them. Therefore, additional time and care must be exercised to ensure that the desired mixture of the solutions being combined is achieved.

The process and apparatus of the present invention overcomes the above-discussed disadvantages. Further, the present invention provides quick and accurate delivery of fluids for compounding, especially sterile fluids. The present invention also provides automatic control for the delivery of fluids as well as sensing the amount of fluid in a collection container.

SUMMARY OF THE INVENTION

In accordance with the present invention, an apparatus and process is provided for compounding two or more solutions preferably under sterile conditions. The apparatus includes an assembly for suspending one or more containers each containing a solution to be compounded. The assembly is adapted to suspend a further receptacle for receiving the solutions to be compounded. Further the apparatus includes a weight sensor for sensing the weight of the fluid in the receptacle.

The solutions, preferably sterile, are transferred from each container in a specific amount to a sterile receptacle to provide a properly compounded sterile solution. This is accomplished by a controller controlling the amount to be transferred from each container in conjunction with the weight sensor for sensing the weight of fluid in the receptacle.

The controller consists of a data entry system to enter the amount, by volume, and the specific gravity of each solution to be compounded. A display is provided for each solution so that an operator may verify the data entered. Once the desired volumes of each solution along with their respective specific gravities are entered into the controller, the apparatus may start compounding by the actuation of a start switch.

In operation the controller actuates a peristaltic pump operatively connected to a container containing the first of the solutions to be compounded. The peristaltic pump is used so that the solutions are transferred sterilely (i.e. there is no contact with the solution by any mechanism of the pump). The first solution is transferred by the peristaltic pump to the sterile receptacle. When the desired volume of the first solution is sensed in the sterile receptacle, the controller deactivates the peristaltic pump. The controller then activates another peristaltic pump operatively connected to another container of a solution to be compounded. The controller carries out its function until the precise amounts of each solution are compounded.

The controller is able to monitor conditions such as no flow, which in turn will signal an empty supply solution, no sterile receptacle in place, or overfill. These conditions once sensed will shut down the operation of the apparatus and will sound an alarm. Further, the controller is able to preform electrical checks for monitoring the various rates of the device. Once the device alarm is actuated, indicating a failure to meet certain operating conditions, the controller ceases operation of the device and will not allow a restart until the condition is rectified.

The solutions are transferred from their respective containers to the sterile receptacle through a network of connectors and fluid lines. The network of the type contemplated for use herein is disclosed and claimed in co-pending U.S. patent application No. 391,784 filed concurrently herewith, in the names of Edward G. Oilschlager, Lawrence R. Hogan, Herbert Mittleman, William L. Rudzena and Ellen Rouch for FLUID COMMUNICATION DEVICE which application is assigned to the assignee of the present invention and is incorporated herein by reference. The FLUID COMMUNICATION DEVICE provides a unitized, sterilized set to be used with the apparatus herein to allow fluid flow from each solution container to the sterile receptacle.

Precise volumetric transfer of solutions is accomplished by the weight sensor being a load cell monitoring the weight of the sterile receptacle. The load cell relays the weight information to the controller which compares this information to the volume information entered. This is accomplished by means of the specific gravity entered for the particular solution being transferred. Once the value for the volume entered equates to the weight sensed, the controller deactivates the pump delivering the solution and activates a succeeding pump for adding the next solution. Further, the device may include from one to three pumps.

The apparatus of the present invention provides for the delivery of sterile solutions by weight to achieve a fast, automatic, efficient, precise method and apparatus for compounding solutions especially for use in hyperalimentation therapy. Further, various malfunction conditions are sensed by the controller of the present invention to deactivate the operation of the present invention to insure overall system accuracy.

DESCRIPTION OF THE PREFERRED EMBODIMENTS

Figure 1:
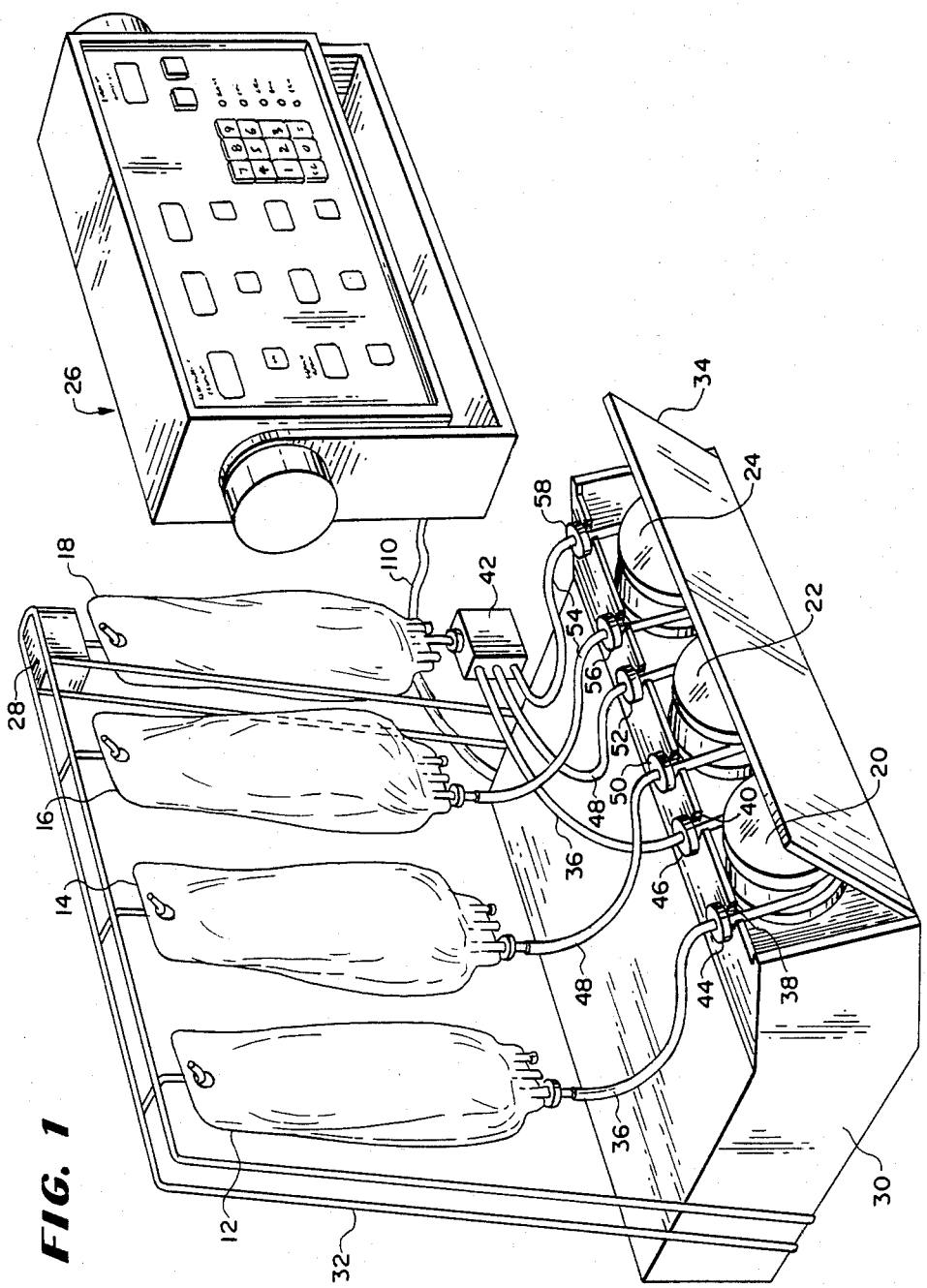
FIG. 1 is a perspective view configured in accordance with the present invention.

Referring now to FIG. 1, a bulk compounding apparatus 10 of the present invention is best illustrated. The apparatus delivers sterile solutions contained in supply containers 12, 14 and 16 respectively to a sterile receptacle or collection container 18. A flexible plastic container used in accordance with this invention is one marketed by Travenol Laboratories, Inc. of Deerfield, Ill. under the registered trademark VIAFLEX.

The apparatus 10 delivers the sterile solutions to be compounded sequentially from the supply containers 12, 14 and 16 to the collection or receiving container 18 by means of peristaltic pumps 20, 22 and 24. The pumps 20, 22 and 24 are operatively controlled by data entered in a controller 26 and the information transmitted to the controller 26 by a load cell 28.

The supply containers 12, 14 and 16 and the collection container 18 are supported vertically above a housing 30 by a bracket 32. The housing 30 provides an enclosure for pumps 20, 22 and 24 and has a housing door 34 movable for easy access to the pumps 20, 22 and 24 for loading, servicing and maintenance thereof. The housing door 34 also serves as a protective cover during operation of the pumps.

The supply container 12 is coupled with the collection container 18 by flexible tubing 36. The flexible tubing 36 enters the housing 30 at inlet 38 and is placed around rollers (not shown) of the peristaltic pump 20. The flexible tubing 36 can be connected to another portion of flexible tubing (not shown) for placement around the rollers of the peristaltic pump. The tubing 36 then exits the housing 30 at outlet 40 and enters a junction block 42 coupled to the collection container 18. The junction block 42 provides a channel through which solutions being pumped through a flexible tube can flow to the collection container 18.

The peristaltic pump 20, in operation, transfers the sterile solution in the supply container 12 to the collection container 18 by movement of the rollers (not shown) in the pump 20. This movement causes a compression of the walls of the flexible tubing 36 forcing the solution therein forward in a capillary type action. Retainers 44 and 46 are placed around the flexible tubing 36 at its entrance to and exit from the housing 30 to keep the tubing 36 in place during the operation of the pump 20.

The supply container 14 is coupled with the collection container 18 by the flexible tubing 48. The sterile solution in the container 14 is delivered to the container 18 by the peristaltic pump 22 in a similar fashion to the fluid delivery from container 12 caused by the pump 20. The flexible tubing 48 also has retainers 50 and 52 placed in a similar manner to the retainers 44 and 46 of the flexible tubing 36. The supply container 16 is coupled with the collection container 18 by flexible tubing 54 with the peristaltic pump 24 therebetween. The tubing 54 has retainers 56 and 58 identical in placement and purpose to the retainers 44, 46, 50 and 52.

Figure 2:
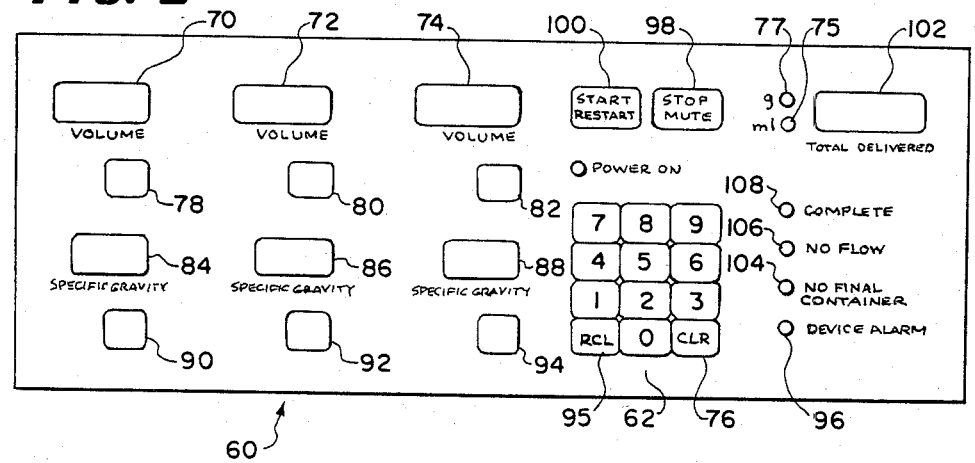
FIG. 2 is a front view of the control panel configured in accordance with the present invention.

The controller 26 has a control panel 60 as best seen in FIG. 2. The control panel 60 has a twelve character keyboard 62 consisting of digits 0 through 9, a recall key and a clear keyboard key. Each of the supply containers is associated with, on the control panel 60, a volume to be delivered display 70, 72 and 74; a volume to be delivered entry switch 78, 80 and 82 for entering respective volume information; a specific gravity display 84, 86 and 88; and a specific gravity entry switch 90, 92 and 94 for entering respective specific gravity information.

To enter the desired value for the volume to be delivered to the collection container 18 from the supply container 12, for example, the volume to be delivered switch 78 is depressed. The volume display 70 then flashes as the desired volume is entered by depressing the appropriate keys of the keyboard 62. The entry of the desired volume is viewed on the volume display 70, and if correct the volume is registered by depressing switch 78 again or by depressing the next desired entry switch. During entry of the volume information a light 75 is illuminated informing the operator that the units being entered are in milliliters. Further, as each value for volume is registered the cumulative total can be displayed in the display 102. If the volume entered is incorrect, the clear button 76 on the keyboard 62 is depressed to erase the volume previously entered and the correct volume is then entered and registered in accordance with the above-described procedures.

To enter the appropriate value for specific gravity of the solution in supply container 12, for example, the specific gravity entry switch 90 is depressed which starts specific gravity display 84 flashing. The value of the specific gravity is entered by depressing the appropriate keys of the keyboard 62. The entry is viewed on display 84 and if correct, switch 90 is again depressed to register the appropriate value or the next entry switch is depressed. This sequence is continued until all the specific gravities are entered. During entry of the value for specific gravity, lights 75 and 77 are illuminated informing the operator that the units being entered are grams per milliliter.

If the specific gravity entered is incorrect, the clear button 76 is depressed to erase the entry and the correct value is then entered and registered in accordance with the above procedures. As can be readily seen the desired volume and specific gravity information can be entered in any sequence desired. Further, by depressing recall key 95 the values for volume and specific gravity entered are shown in their respective displays.

Once all the volume and specific gravity information has been entered and registered and the containers connected, the apparatus 10 can be operated. By depressing START/RESTART switch 100, the compounding operation begins, the volume to be delivered displays 70, 72 and 74 are zeroed automatically and count up as the volume of each solution is delivered one solution at a time to the collection container 18. The volume information will be retained on the displays until the container 18 is removed. The total volume to be delivered display 102 also will be zeroed automatically and register as the solutions are delivered to provide cumulative volume information which is indicated by light 75 being illuminated. This information likewise will be retained until removal of the container 18 occurs.

In the event the controller 26 has sensed a failure of any predetermined operating condition or when compounding is complete, the compounding operation automatically will stop and audible and visual alarms will be activated. By depressing the STOP/MUTE switch 98 the audible alarms will be silenced. The predetermined operating conditions are no flow, no collection container or completed compounding. There are associated with each sensed failure a flashing light 104, 106, 108 to indicate the failure that has been detected. Once the failure has been corrected switch 100 can be depressed to continue compounding operations. Further, in the event of a sensed failure and shutdown, the information entered for volume and specific gravity will be remembered as well as the stage of the operation so as to continue forth from the point of the detected failure. The control panel 60 is also equipped with a power indicator lamp 109 to indicate that power is supplied to the unit.

The controller 26 also includes internal electrical checks to monitor various electrical components as well as the amount per unit time functions of the device. In the event of a malfunction of one of these conditions the compounder will cease operations and device alarm light 96 will be illuminated. These operating functions have been selected to be non-fixable by the operator and therefore the compounder will not allow a restart until properly serviced.

Figure 3:
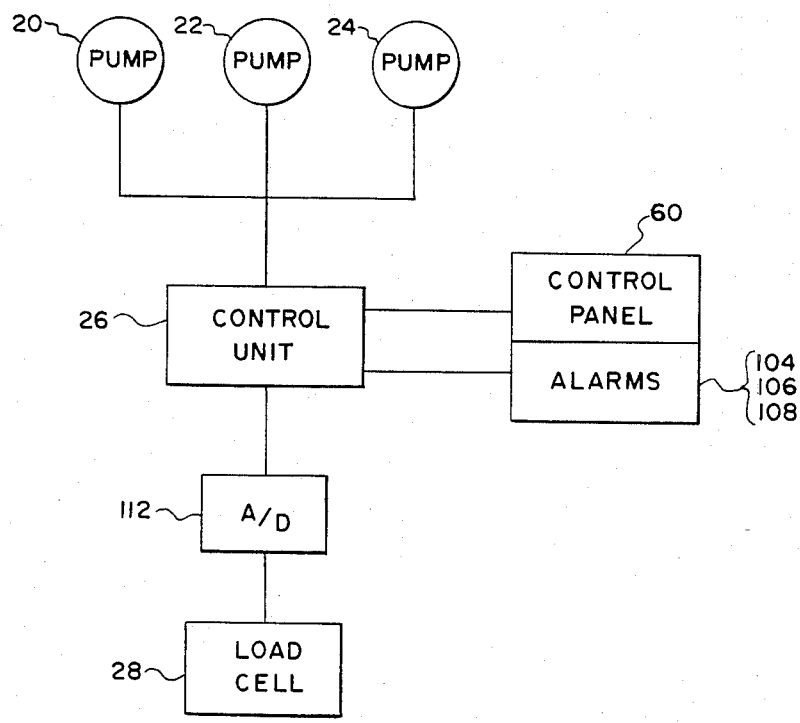
FIG. 3 is a schematic block diagram of the system of the present invention.

FIG. 3 depicts, in block form, how volume and failures of predetermined operating conditions are sensed and interpreted. The controller 26 receives information from load cell 28 and directs electrical current through electrical connector 110 (FIG. 1) to drive the pumps 20, 22 and 24. After the desired volume and specific gravity information has been entered and registered, switch 100 is depressed to start the compounding operation. In operation, the controller 26 activates the pump 20 which continues pumping until the weight sensed by load cell 28, of the container 18, corresponds to the amount registered in the controller 26.

An analog to digital converter 112 converts the analog signal of the load cell 28 to a digital signal readable by the controller 26. The controller 26 then converts volume and specific gravity information to a value of weight and compares it to the weight sensed by the load cell. Once the volume of the solution from the container 12 has been delivered, pump 20 is deactivated by controller 26 and solutions from the container 14 and then the container 16 are then delivered in accordance with the above discussion. When all the solutions have been delivered, controller 26 senses a complete compounding operation and activates alarm 108 on control panel 60.

In the start mode if a predetermined weight is not sensed by the load cell, i.e. the weight of empty or partially filled collection container 18, controller 26 activates alarm 104 on control panel 60 alerting the operator of the absence of a collection container and does not initiate compounding operation. Also, if while operating, there is no increase in weight sensed by the load cell 28 for a given amount of time, as may be caused by empty supply containers, broken tubing, blockage etc., the compounding operation will be deactivated and the alarm 106 on panel 60 will be activated. Further, if while operating, the weight sensed by the load cell 28 increases at a rate faster or slower than a predetermined rate, as may be caused by multiple pumps operating simultaneously or a line blockage, the compounding operation will be deactivated and the alarm 96 on panel 60 will be activated.

The method and apparatus of the present invention hereinabove described provides a fast, efficient, precise, sterile way of compounding solutions. The solutions are transferred by peristaltic pumps to insure sterility and the amounts are monitored gravimetrically to insure fast transfer, while maintaining accuracy. Further, when various failures of predetermined operating conditions are sensed, the compounding operation is ceased and alarms are activated to warn the operator of the malfunction.

The apparatus also includes a system check by placing a predetermined weight or weight on the load cell and the operator then can adjust the load cell to calibrate it with respect to the weight. Further the load cell can be calibrated to correspond to zero with the weight of an empty receiving container thereon.

A specific system of a unitized network of fluid lines, connectors and fittings that preferably can be utilized with the apparatus of the present invention to transfer fluid, is disclosed in the aforementioned co-pending application incorporated herein. The system provides an economical, sterilized set that is coded for proper orientation with respect to the present invention.

Modification and variations of the present invention are possible in light of the above teachings. The present invention has been described as compounding sterile solutions, such as under a laminar flow hood. Also, it can be readily seen that other nonsterile solutions can be compounded utilizing the method and apparatus hereinabove described. It is therefore, to be understood that within the scope of the appended claims the invention may be practiced otherwise than as specifically described.

What is claimed and desired to be secured by Letters Patent of the United States is:

1. A system for volumetrically compounding at least two fluids having different specific gravities comprising:
    a source of a first fluid having a first specific gravity,
    a source of a second fluid having a second specific gravity different than said first specific gravity,
    a compounding container communicating with each of said filuid sources for receiving a desired volume of said first fluid and a desired volume of said second fluid,
    first pumping means for conveying said first fluid from its source into said compounding container,
    second pumping means for conveying said second fluid from its source into said compounding container, and
    means for individually controlling said first and second pumping means including
    means for entering and registering said first specific gravity and said desired volume of said first fluid to be conveyed into said compounding container,
    means for registering a first control value comprising the product of said first specific gravity and said desired volume of said first fluid,
    means for entering and registering said second specific gravity and said desired volume of said second fluid to be conveyed into said compounding container,
    means for registering a second control value comprising the product of said second specific gravity and said desired volume of said second fluid,
    means for sensing the weight of the contents of said compounding container,
    first control means operative, when said sensed weight of the contents of said compounding container is less than said first control value, for operating only said first pumping means to convey only said first fluid into said compounding container, and
    second control means operative, when said sensed weight of the contents of said compounding container is equal to or exceeds said first control value, for terminating the operation of said first pumping means and for operating only said second pumping means to convey only said second fluid into said compounding container until the increase in said sensed weight of the contents of said compounding container during operation of said second pumping means generally equals said second control value.

* * * * *